(12) United States Patent  
Parraga Gimeno

(10) Patent No.: US 8,226,518 B2
(45) Date of Patent: Jul. 24, 2012

(54) CONTINUALLY VARIABLE TRANSMISSION

(75) Inventor: Javier Parraga Gimeno, Boadilla del Monte (Madrid) (ES)

(73) Assignee: Power Gear S.L., Boadilla Del Monte (ES)

( * ) Notice: Subject to any disclaimer, the term of this patent is extended or adjusted under 35 U.S.C. 154(b) by 664 days.

(21) Appl. No.: 11/916,484

(22) PCT Filed: Jun. 6, 2005

(86) PCT No.: PCT/ES2005/070085
§ 371 (c)(1),
(2), (4) Date: Dec. 12, 2007

(87) PCT Pub. No.: WO2006/131574
PCT Pub. Date: Dec. 14, 2006

(65) Prior Publication Data
US 2009/0023532 A1    Jan. 22, 2009

(51) Int. Cl.
*F16H 37/02* (2006.01)
(52) U.S. Cl. .......... 475/211; 475/210; 475/219
(58) Field of Classification Search .......... 475/207, 475/210, 211, 218, 219; 474/72
See application file for complete search history.

(56) References Cited

U.S. PATENT DOCUMENTS

| | | | |
|---|---|---|---|
| 3,479,908 A | 11/1969 | Kress | |
| 3,489,036 A | 1/1970 | Cockrell | |
| 4,602,525 A * | 7/1986 | Moroto et al. | 475/210 |
| 5,112,283 A * | 5/1992 | Miyata et al. | 475/211 |
| 5,183,444 A * | 2/1993 | Robbins | 475/210 |
| 5,853,343 A * | 12/1998 | Eggert et al. | 475/210 |
| 5,890,987 A * | 4/1999 | Lamers | 475/210 |
| 6,106,428 A * | 8/2000 | Koneda et al. | 475/210 |
| 6,358,178 B1 * | 3/2002 | Wittkopp | 475/207 |
| 6,447,422 B1 * | 9/2002 | Haka | 475/211 |
| 6,561,942 B2 * | 5/2003 | Wehking | 475/216 |
| 6,648,787 B1 | 11/2003 | Coffer | |
| 2004/0082421 A1 | 4/2004 | Wafzig | |
| 2004/0166984 A1 * | 8/2004 | Inoue | 475/207 |

FOREIGN PATENT DOCUMENTS

| | | | |
|---|---|---|---|
| DE | 3538343 A1 * | 5/1986 | |
| EP | 0541771 A1 | 5/1993 | |
| GB | 1515687 A | 6/1978 | |

OTHER PUBLICATIONS

Dec. 14, 2006, ISR of PCT/ES2005/070085.

* cited by examiner

*Primary Examiner* — Roger Pang
(74) *Attorney, Agent, or Firm* — Neifeld IP Law, PC

(57) ABSTRACT

Continuously variable transmission is discloses as comprising a continuously variable speed device such that the speed of the final outlet shaft (8) may be varied in any rotation direction and to zero using a combination of different diameters of a first pulley.

8 Claims, 1 Drawing Sheet

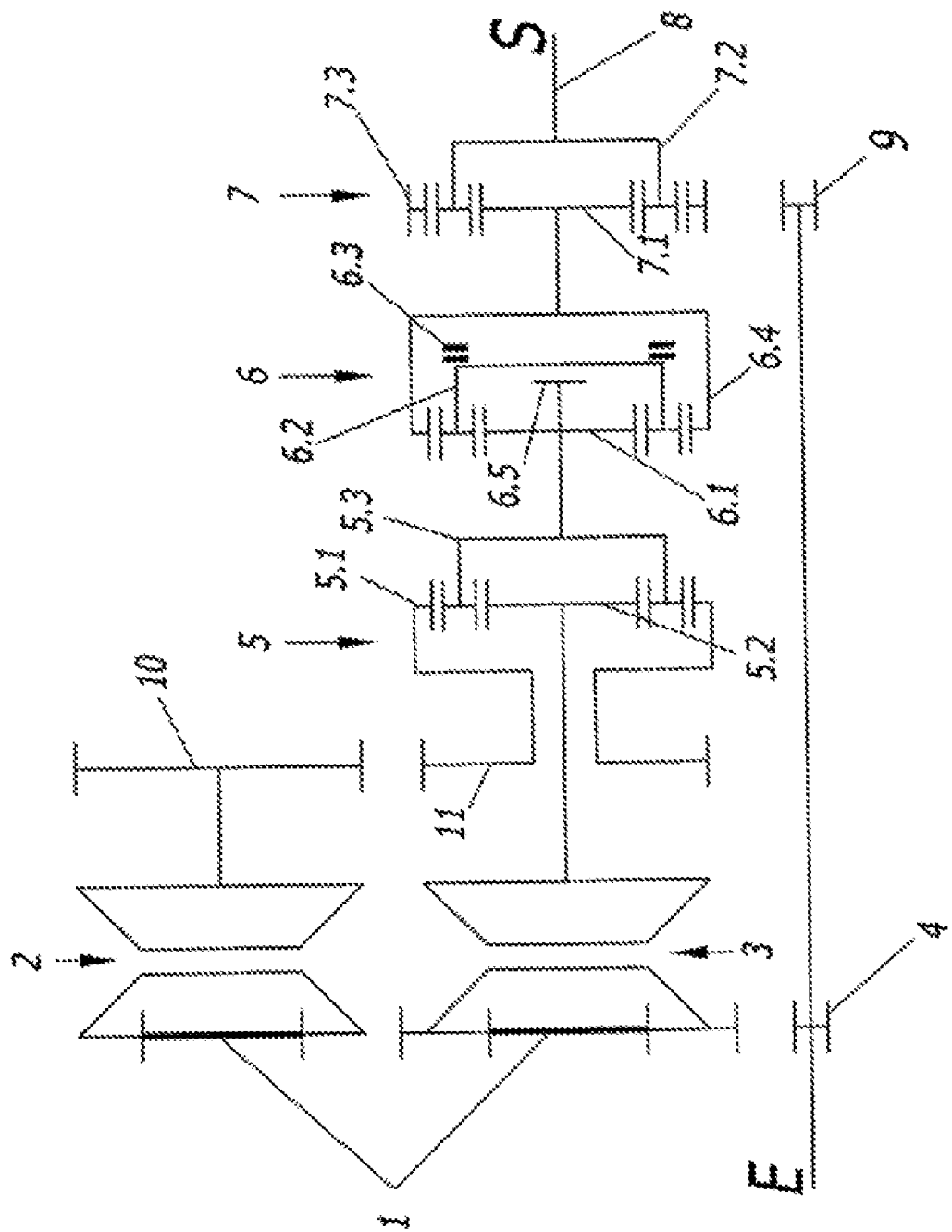

CONTINUALLY VARIABLE TRANSMISSION

OBJECT OF THE INVENTION

The present invention refers to a continually variable transmission, of the type of transmission of movements using variable speed device, one of each has a conical surface.

This invention is characterised by its special construction of a transmission with power derivation at the output and to the main motor, incorporating an intercalated differential mechanism which reduces the rotation speed of the intermediate shaft to zero in either direction, thus achieving the advantages of a greater speed variation range, using the high torque transmitted, apart from the financial savings deriving therefrom.

BACKGROUND TO THE INVENTION

For some years mechanical power systems have been known of the type able to continually change their rate of speed, generally in the range of medium and low power, usually obtained by continual variation of the ratio of the radiuses of two pulleys, in particular in those applications in which their characteristics lend themselves to this type of system, such as agricultural machinery and also the "gear box" of all kinds of vehicles.

Another related registration is U.S. Pat. No. 6,517,461 in the name of Nissan Motor Co., which consists of a transmission mechanism incorporating a helical gear which meshes with a final outlet gear which transmits rotation to the final mechanism of the shaft, with the sides of the teeth and the final outlet the final output shaft of a ring gear arranged in such a way that the force exercised on the ring by a planetary gear and the force exercised by the transmission act in opposite directions.

In the automotive field patent ES 2068047 may also be cited: "Continual mechanical gear change" which incorporates a pair of tapered pulleys, with an intermediate flexible transmission element together with a power transmission mechanism and a planetary gear arranged at the outlet connecting, the first pulley to the entry shaft of the system, while the second is connected to the entry shaft of the power transmission mechanism, the outlet shaft of which activates one of the planetary elements while the remaining elements are related respectively with the entry shaft and the outlet shaft of the device which is the object of the invention, in various arrangements and distributions of these elements.

Despite its validity and opportunity, this invention generates a discontinuity in the transmission relation between the pair of pulleys, in particular with respect to the shaft speed of the entry and outlet shafts, which leads to a need to change the direction of the outlet shaft when the speed is still relatively high, with subsequent disadvantages in the long term with respect to stress and wear etc.

The applicant is unaware of mechanical transmissions which are genuinely continual and with a high range of variation of revolutions of the outlet shaft, in addition to high torque, which resolve the aforementioned problem by incorporating a differential mechanism which dispenses with the need for reverse gear and clutch, and which also resolves this problem with the simplicity and effectiveness of the invention described herein.

DESCRIPTION OF THE INVENTION

The present invention refers to a continually variable transmission, of the type of transmission of movements using variable speed device and in particular, one of these having a conical surface as well as incorporating epicyclic gears.

An external driving couples to the aforementioned variable speed device, partially receiving power from the motor shaft by means of a pinion gear and provided with tapered pulleys both of which connected to a differential mechanism, for example, one of these connected to the crown wheel of an epicyclical gear, while the other pulley is linked to the sun and the satellite carrier of the planetary gear set and transmits that power to a subsequently arranged reducer mechanism.

This reducer, for example, may be a new epicyclical gear which is arranged intermediately in respect of another outlet device in a similar construction.

The reducer of the sun is coupled to the satellite carrier of the differential mechanism. A device which blocks the sun and the satellite carriers of the reducer in this phase permits a transmission ratio of 1:1. Optionally, the satellite carrier may be blocked with the crown wheel obtaining the same effect.

The satellite carrier of the reducer is provided with a means of fixation as a brake so that having established this fixation, the group acts as a reducer. The crown wheel is connected to the sun of the final reduction phase.

In this outlet device or final phase of reduction, identified as third epicyclical gear the satellite carrier is in turn connected to the outlet shaft of the transmission, in this way deriving the aforementioned fraction of the entry power to the two pulleys. It will be seen that in an example of an embodiment the crown wheel of this third epicyclical gear is coupled to the entry shaft.

In order to reduce the speed of the outlet shaft of the final epicyclical gear in any of its directions to zero, to this transmission construction described with, on one hand, derivation of power to the outlet and, on the other, to the main drive body, it is required that the pulley connected to the motor shaft is arranged as closely as possible to the maximum diameter and that the sun and the differential satellite carrier are interlocked.

The fact that there are no relative speeds between the coupling bodies enables the clutches such as those used in the state of the art to be dispensed with when they are designed to absorb different relative speeds.

In the forward gear, in order to increase the outlet variation range the fact that the differential outlet speed is zero when the motor pulley approximates to the range of minimum diameter is taken advantage of to stop the epicyclical gear satellite carrier with the interlocking mechanism at zero speed of the intermediate shaft, that is, with without friction. In this way a different transmission ratio is applied which enables the motor pulley to be varied in the opposite direction however, continually increasing the speed of the mechanism outlet.

In addition, in order to obtain reverse movement the pulley attached to the motor shaft should be positioned at its maximum diameter with the satellite carrier interlock disconnected and with the sun joined to the satellite carrier.

To summarise, this means of working with continual speed variation is as follows:

| Rotation at the outlet of the final epicyclical gear | Diameter of the power pulley | Sun-satellite carrier interlock | Satellite carrier Interlock |
|---|---|---|---|
| Reverse | Maximum | Connected | Disconnected |
| Stopped | Close to maximum | Connected | Disconnected |

-continued

| Rotation at the outlet of the final epicyclical gear | Diameter of the power pulley | Sun-satellite carrier interlock | Satellite carrier Interlock |
|---|---|---|---|
| Forward | Reducing | Connected | Disconnected |
| Forward rapid and close to intermediate range | Close to minimum | Connected | Disconnected |
| Intermediate range (outlet speed of the differential shaft = 0 | Minimum | Disconnected | Connected |
| Increasing speed to the maximum | Increasing to the maximum | Disconnected | Connected |

DESCRIPTION OF THE DRAWINGS

The present descriptive report is complemented by a set of plans illustrating a preferred embodiment of the invention but which is in no way restrictive.

FIG. 1 shows a diagram of the transmission according to a preferred embodiment of the three interconnected epicyclical gears of the invention.

PREFERRED EMBODIMENT OF THE INVENTION

The present invention refers to a continually variable transmission, of the type of transmission means using variable speed device and in particular, one of these having a conical surface as well as incorporating epicyclical gears.

In accordance with the preferred embodiment of FIG. 1, an external drive (1) is coupled to the variable speed device (2) and (3) connected to an epicyclical gear (5) partially receiving the power from the motor shaft, by means of a gear pinion (4) and with the tapered pulley (2) connected to the crown wheel (5.1) through transmission means (10) and (11) in this example, of the epicyclic gear (5) while the other pulley (3) is linked to the sun (5.2) and the satellite carrier (5.3) transmits this power to a subsequently arranged epicyclic gear (6) coupled or interlocked (6.5) with the satellite carrier (6.2) of the epicyclic gear (6), in addition the satellite carrier (6.2) is coupled to an interlock (6.3) and its crown wheel (6.4) is connected to the sun (7.1) of the epicyclic gear (7) the satellite carrier of which (7.2) is in turn connected to the outlet shaft (8) of the transmission, thus deriving from this the aforementioned fraction of the entry power to the two pulleys (2) and (3) while the crown wheel (7.3) of this third epicyclical gear (7) is made with the gear pinion (9) of the entry shaft.

In order to reduce the speed of the outlet shaft (8) of the epicyclic gear (7) to zero in any direction it is essential that the pulley (3) connected to the motor shaft is arranged close to the maximum diameter and that the sun (6.1) and the satellite carrier (6.2) of the epicyclic gear (6) are interlocked.

In order to obtain reverse gear, the pulley (3) should be positioned at its maximum diameter, with the interlocking (6.3) of the satellite carrier (6.2) disconnected and connecting the interlock (6.5).

In the forward gear, a progression of pulley (3) diameters is made from the diameter closest to maximum to the diameter closest to minimum and with the interlocking (6.3) of the satellite carrier (6.2) disconnected and connected to the interlock (6.5). In order to increase the outlet variation range, the fact that the satellite carrier (5.3) outlet speed is zero when the pulley (3) approximates to its range of minimum diameter is taken advantage of to stop the epicyclical gear satellite carrier (6.2) with the interlocking mechanism (6.3) at zero speed of the intermediate shaft.

In order to further increase the range of actuation the pulley (3) progression is varied in the inverse direction, that is, from its minimum diameter to its maximum diameter.

The aforementioned mechanical transmission effectively generates a continual reduction, either a continual multiplication or a continual transmission ratio of 1:1.

In applications with low torque requirement and/or reduced variation range, the epicyclical gear (6) may be dispensed with, thus joining the satellite carrier (5.3) of the epicyclical gear (5) with the sun (7.1) of the epicyclical gear (7).

The essential nature of this invention is not altered by any variations in materials, form, size and arrangement of its component elements, described in a non-restrictive manner, with this being sufficient to proceed to its reproduction by an expert.

The invention claimed is:

1. A continuously variable transmission, comprising:
   a continuously variable speed device;
   the continuously variable speed device comprising a first epicyclic gear and a variator of a belt type with a first and a second pulley;
   the first epicyclic gear is coupled to the first and second pulley and to an intermediate shaft;
   the variable speed device is able to reduce the rotation speed of the intermediate shaft to zero from either rotation direction;
   the continuously variable transmission further comprising an entry shaft, a reducer and a second epicyclical gear;
   the entry shaft is coupled to the first pulley of the belt type variator and to the second epicyclic gear;
   the reducer is placed axially between the first and second epicyclic gear and is coupled to the intermediate shaft and the second epicyclic gear;
   a final outlet shaft of the continuously variable transmission is coupled to the second epicyclic gear;
   the speed of the final outlet shaft may be varied in any rotation direction and to zero by means of a combination of different diameters of the first pulley together with various forms of interlocking of reducer elements generating either a reducer transmission ratio of 1:1 or a different reducer transmission ratio;
   wherein:
   the first pulley is coupled to a sun of the first epicyclical gear;
   the second pulley is coupled to a crown wheel of the first epicyclic gear through transmission means;
   the reducer is an epicyclic gear;
   the intermediate shaft is coupled to a satellite carrier of the first epicyclic gear and to a sun of the reducer;
   a crown wheel of the reducer is coupled to a sun of the second epicyclic gear;
   a satellite carrier of the second epicyclic gear is coupled to the final outlet shaft;
   the entry shaft having a first and a second gear pinion;
   a crown wheel of the second epicyclic gear is coupled to the second gear pinion of the entry shaft;
   the first pulley is coupled to the entry shaft by a first gear pinion;
   the reducer generating a reducer transmission ratio of 1:1 when the sun and a satellite carrier of the reducer are interlocked or generating a different reducer transmission ratio when the satellite carrier is stopped by an interlocking mechanism.

2. A continuously variable transmission, comprising:
   a drive shaft;
   a first gear pinion;
   a variable speed device comprising a first tapered pulley and a second tapered pulley;
   said first gear pinion coupling said drive shaft to said first tapered pulley;
   a first epicyclic gear having a first epicyclic gear crown, a first epicyclic gear sun, and a first epicyclic gear satellite;
   said first tapered pulley coupled to said first epicyclic gear sun;
   said second tapered pulley coupled to said first epicyclic gear crown;
   a second epicyclic gear having a second epicyclic gear satellite carrier, a second epicyclic gear satellite first couple or interlock, a second epicyclic gear satellite second interlock, and a second epicyclic gear satellite crown wheel;
   said first epicyclic gear satellite coupling said first epicyclic gear sun and said first epicyclic gear crown to said second epicyclic gear satellite first couple or interlock;
   second epicyclic gear satellite carrier coupled to said second epicyclic gear satellite second interlock;
   a third epicyclic gear having a third epicyclic gear satellite carrier, a third epicyclic gear sun, a third epicyclic gear crown wheel;
   said second epicyclic gear satellite crown wheel connected to said third epicyclic gear sun;
   a second gear pinion;
   said second gear pinion coupling said drive shaft to said third epicyclic gear crown wheel;
   an outlet shaft; and
   said third epicyclic gear satellite carrier connected to said outlet shaft.

3. The transmission of claim 2 wherein said second epicyclic gear sun and said second epicyclic gear satellite carrier are interlocked using a function of said second epicyclic gear satellite first couple or interlock.

4. The transmission of claim 2 wherein said second epicyclic gear satellite second interlock is disconnected from said second epicyclic gear satellite first couple or interlock.

5. The transmission of claim 2 which excludes a clutch.

6. A method of using a continuously variable transmission, said continuously variable transmission comprising:
   a drive shaft;
   a first gear pinion;
   a variable speed device comprising a first tapered pulley and a second tapered pulley;
   said first gear pinion coupling said drive shaft to said first tapered pulley;
   a first epicyclic gear having a first epicyclic gear crown, a first epicyclic gear sun, and a first epicyclic gear satellite;
   said first tapered pulley coupled to said first epicyclic gear sun;
   said second tapered pulley coupled to said first epicyclic gear crown;
   a second epicyclic gear having a second epicyclic gear satellite carrier, a second epicyclic gear satellite first couple or interlock, a second epicyclic gear satellite second interlock, and a second epicyclic gear satellite crown wheel;
   said first epicyclic gear satellite coupling said first epicyclic gear sun and said first epicyclic gear crown to said second epicyclic gear satellite first couple or interlock;
   second epicyclic gear satellite carrier coupled to said second epicyclic gear satellite second interlock;
   a third epicyclic gear having a third epicyclic gear satellite carrier, a third epicyclic gear sun, a third epicyclic gear crown wheel;
   said second epicyclic gear satellite crown wheel connected to said third epicyclic gear sun;
   a second gear pinion;
   said second gear pinion coupling said drive shaft to said third epicyclic gear crown wheel;
   an outlet shaft; and
   said third epicyclic gear satellite carrier connected to said outlet shaft;
   said method comprising rotating said outlet shaft.

7. The method of claim 6 further comprising reducing the rotation of said outlet shaft comprising interlocking said second epicyclic gear sun and said second epicyclic gear satellite carrier.

8. The method of claim 6 further comprising reversing direction of rotation of said outlet shaft comprising disconnecting said second epicyclic gear satellite second interlock and said second epicyclic gear satellite first couple or interlock.

* * * * *

UNITED STATES PATENT AND TRADEMARK OFFICE
CERTIFICATE OF CORRECTION

PATENT NO. : 8,226,518 B2
APPLICATION NO. : 11/916484
DATED : July 24, 2012
INVENTOR(S) : Gimeno It is certified that error appears in the above-identified patent and that said Letters Patent is hereby corrected as shown below:

Title Page item (73) Change "Power Gear S.L., Boadilla Del Monte" to --POWERTRACK INTERNATIONAL DE AUTOMOCION S.L.--

Signed and Sealed this
Eighth Day of January, 2013

David J. Kappos
*Director of the United States Patent and Trademark Office*